United States Patent
Aharonov et al.

(10) Patent No.: US 11,308,419 B2
(45) Date of Patent: Apr. 19, 2022

(54) LEARNING SENTIMENT COMPOSITION FROM SENTIMENT LEXICONS

(71) Applicant: International Business Machines Corporation, Armonk, NY (US)

(72) Inventors: Ranit Aharonov, Ramat Hasharon (IL); Roy Bar-Haim, Ramat Gan (IL); Alon Halfon, Rishon Lezion (IL); Charles Arthur Jochim, Dublin (IE); Amir Menczel, Ashdod (IL); Noam Slonim, Jerusalem (IL); Orith Toledo-Ronen, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 16/191,478

(22) Filed: Nov. 15, 2018

(65) Prior Publication Data
US 2020/0065716 A1 Feb. 27, 2020

Related U.S. Application Data

(60) Provisional application No. 62/720,971, filed on Aug. 22, 2018.

(51) Int. Cl.
*G06N 20/00* (2019.01)
*G06F 17/18* (2006.01)
(Continued)

(52) U.S. Cl.
CPC ............ *G06N 20/00* (2019.01); *G06F 17/18* (2013.01); *G06F 40/30* (2020.01); *G06F 40/284* (2020.01)

(58) Field of Classification Search
CPC ......... G06N 20/00; G06F 40/30; G06F 17/18; G06F 40/284
See application file for complete search history.

(56) References Cited

U.S. PATENT DOCUMENTS

| 8,352,405 B2 | 1/2013 | Fang et al. |
| 9,632,998 B2 | 4/2017 | Aharon et al. |

(Continued)

OTHER PUBLICATIONS

Dong, Li, Furu Wei, Shujie Liu, Ming Zhou, and Ke Xu. "A statistical parsing framework for sentiment classification." Computational Linguistics 41, No. 2 (2015): 293-336. (Year: 2015).*

(Continued)

*Primary Examiner* — Alexey Shmatov
*Assistant Examiner* — Casey R. Garner
(74) *Attorney, Agent, or Firm* — Dvir Gassner

(57) ABSTRACT

A method including: generating, from a text corpus, a lexicon of unigrams and bigrams comprising an embedding for each of said unigrams and bigrams; training a machine learning classifier on a training set comprising a subset of said lexicon, wherein each of said unigrams and bigrams in said subset has a sentiment label; applying said machine learning classifier to said lexicon, to (i) predict a sentiment of each of said unigrams and bigrams, and (ii) update said lexicon with the predicted sentiments; and performing statistical analysis on said updated lexicon, to extract one or more sentiment composition lexicons, wherein each of said one or more sentiment composition lexicons is associated with a sentiment composition class.

14 Claims, 2 Drawing Sheets

(51) Int. Cl.
    *G06F 40/30*     (2020.01)
    *G06F 40/284*     (2020.01)

(56) References Cited

U.S. PATENT DOCUMENTS

| | | | |
|---|---|---|---|
| 9,697,196 | B2 | 7/2017 | Zhang et al. |
| 2008/0249764 | A1* | 10/2008 | Huang .................. G06F 40/30 704/9 |
| 2012/0271788 | A1* | 10/2012 | Fang .................... G06F 40/242 706/50 |
| 2013/0204613 | A1 | 8/2013 | Godbole et al. |
| 2016/0217130 | A1 | 7/2016 | Moilanen et al. |
| 2017/0060996 | A1 | 3/2017 | Das |

OTHER PUBLICATIONS

Williams, Gbolahan K., and Sarabjot Singh Anand. "Predicting the polarity strength of adjectives using wordnet." In Third International AAAI Conference on Weblogs and Social Media. 2009. (Year: 2009).*

Moilanen, Karo, and Stephen Pulman. "Sentiment composition." (2007). (Year: 2007).*

Yang Li et al., "Learning Word Representations for Sentiment Analysis", Cognitive Computation, Dec. 2017, vol. 9, Issue 6, pp. 843-851.

Yongyos Kaewpitakkun et al., "Sentiment lexicon interpolation and polarity estimation of objective and out-of-vocabulary words to improve sentiment classification on microblogging", 28th Pacific Asia Conference on Language, Information and Computation, 2014, pp. 204-213.

Marc Schulder et al., "Towards Bootstrapping a Polarity Shifter Lexicon using Linguistic Features", Proceedings of the The 8th International Joint Conference on Natural Language Processing, 2017, pp. 624-633.

Livia Polanyi et al., "Contextual Valence Shifters", AAAI Spring Symposium, 2004.

Karo Moilanen et al., "Sentiment composition", Sep. 2007, In Proceedings of RANLP, vol. 7, pp. 378-382.

Alena Neviarouskaya et al., "Recognition of affect judgment, and appreciation in text", COLING '10 Proceedings of the 23rd International Conference on Computational Linguistics, 2010, pp. 806-814.

Svetlana Kiritchenko et al., "Sentiment composition of words with opposing polarities", Proceedings of NAACL-HLT, 2016, pp. 1102-1108.

Richard Socher et al., "Recursive deep models for semantic compositionality over a sentiment treebank", Conference on Empirical Methods in Natural Language Processing (EMNLP), 2013.

* cited by examiner

LEARNING SENTIMENT COMPOSITION FROM SENTIMENT LEXICONS

CROSS-REFERENCE TO RELATED APPLICATIONS

This application claims the benefit of priority to U.S. Provisional Patent Application No. 62/230,971, filed Aug. 22, 2018, entitled "Learning Sentiment Composition from Sentiment Lexicons", the contents of which are incorporated herein by reference in their entirety.

BACKGROUND

The invention relates to the field of automated sentiment analysis.

Sentiment analysis is a sophisticated computerized method by which tools such as natural language processing (NLP), text analysis, computational linguistics, and machine learning, are used to determine opinions and feelings from a text. Sentiment analysis may be typically applied to on-line ratings, social media posts, and other similar situations, to discern an attitude or emotional stance of a speaker, or the overall contextual polarity of a document, interaction, or event.

Many sentiment analysis systems rely primarily on the sentiment of individual words in a text. However, precise sentiment analysis often requires lexical-semantic knowledge that goes beyond word-level sentiment, even when dealing with short phrases such as bigrams. The sentiment of most phrases is compositional, namely, it is determined from the interaction between their constituents. In such cases, compositional sentiment analysis may help more accurately determine a sentiment based on the interaction between the constituent words of a phrase.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising operating at least one hardware processor for: generating, from a text corpus, a lexicon of unigrams and bigrams comprising an embedding for each of said unigrams and bigrams; training a machine learning classifier on a training set comprising a subset of said lexicon, wherein each of said unigrams and bigrams in said subset has a sentiment label; applying said machine learning classifier to said lexicon, to (i) predict a sentiment of each of said unigrams and bigrams, and (ii) update said lexicon with the predicted sentiments; and performing statistical analysis on said updated lexicon, to extract one or more sentiment composition lexicons, wherein each of said one or more sentiment composition lexicons is associated with a sentiment composition class.

There is also provided, in an embodiment, a system comprising at least one hardware processor; and a non-transitory computer-readable storage medium having stored thereon program instructions, the program instructions executable by the at least one hardware processor to: generate, from a text corpus, a lexicon of unigrams and bigrams comprising an embedding for each of said unigrams and bigrams; train a machine learning classifier on a training set comprising a subset of said lexicon, wherein each of said unigrams and bigrams in said subset has a sentiment label; apply said machine learning classifier to said lexicon, to (i) predict a sentiment of each of said unigrams and bigrams, and (ii) update said lexicon with the predicted sentiments; and perform statistical analysis on said updated lexicon, to extract one or more sentiment composition lexicons, wherein each of said one or more sentiment composition lexicons is associated with a sentiment composition class.

There is further provided, in an embodiment, a computer program product comprising a non-transitory computer-readable storage medium having program instructions embodied therewith, the program instructions executable by at least one hardware processor to: generate, from a text corpus, a lexicon of unigrams and bigrams comprising an embedding for each of said unigrams and bigrams; train a machine learning classifier on a training set comprising a subset of said lexicon, wherein each of said unigrams and bigrams in said subset has a sentiment label; apply said machine learning classifier to said lexicon, to (i) predict a sentiment of each of said unigrams and bigrams, and (ii) update said lexicon with the predicted sentiments; and perform statistical analysis on said updated lexicon, to extract one or more sentiment composition lexicons, wherein each of said one or more sentiment composition lexicons is associated with a sentiment composition class.

In some embodiments, said sentiment labels are acquired from a known sentiment lexicon.

In some embodiments, said predicted sentiment is selected from the group consisting of: positive, negative, and neutral.

In some embodiments, the method further comprises operating said at least one hardware processor, and, in the case of the system and computer program product, the program instructions are further executable, to predict a sentiment of a bigram comprising a first unigram from a said sentiment composition lexicon based, at least in part, on meeting one or more conditions of said associated sentiment composition class. In some embodiments, said conditions comprise at least one of (i) an ordering of said first unigram and a second unigram within said bigram, (ii) a sentiment of said first unigram, and (iii) a sentiment of said second unigram.

In some embodiments, with respect to each said sentiment composition class, said statistical analysis comprises determining a statistical ratio between (i) all bigrams in said updated lexicon meeting said conditions of said sentiment composition class, and (ii) all bigrams in said updated lexicon meeting said conditions of said sentiment composition class, whose sentiment is equal to said predicted sentiment associated with said sentiment composition class.

In some embodiments, said statistical analysis further takes into account, with respect to each bigram, a probability of said prediction performed by said machine learning classifier.

In some embodiments, said sentiment composition class is selected from the group consisting of: a reverser class, a propagator class, and a dominator class.

In some embodiments, when said first unigram is associated with said reverser class, said predicted bigram sentiment is the opposite of said second unigram sentiment.

In some embodiments, when said first unigram is associated with said propagator class, said predicted bigram sentiment is equal to said second unigram sentiment.

In some embodiments, when said first unigram is associated with said dominator class, said predicted bigram sentiment is equal to said first unigram sentiment.

In some embodiments, said sentiment composition class is an adjective class, wherein a bigram comprising a unigram from a said sentiment composition lexicon associated with said adjective class has (i) a first predicted sentiment when paired with a first adjective from a specified pair of antonymic adjectives, and (ii) an opposite predicted sentiment when paired with a second adjective from said specified pair of antonymic adjectives.

In some embodiments, with respect to each unigram in said adjective composition class, said statistical analysis comprises determining whether a combined score equal to an absolute value of (i) an average sentiment score for all bigrams comprising said unigram and said first adjective, less (ii) an average sentiment score for all bigrams comprising said unigram and said second adjective, meets a specified threshold.

In some embodiments, each adjective in said specified pair of antonymic adjectives comprises a plurality of synonyms of said adjective.

In some embodiments, said calculating of said sentiment-oriented embeddings comprises determining a positive pointwise mutual information (PPMI) with a set of seed sentiment unigrams, wherein said set of seed sentiment unigrams comprises said unigram sentiment lexicon.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
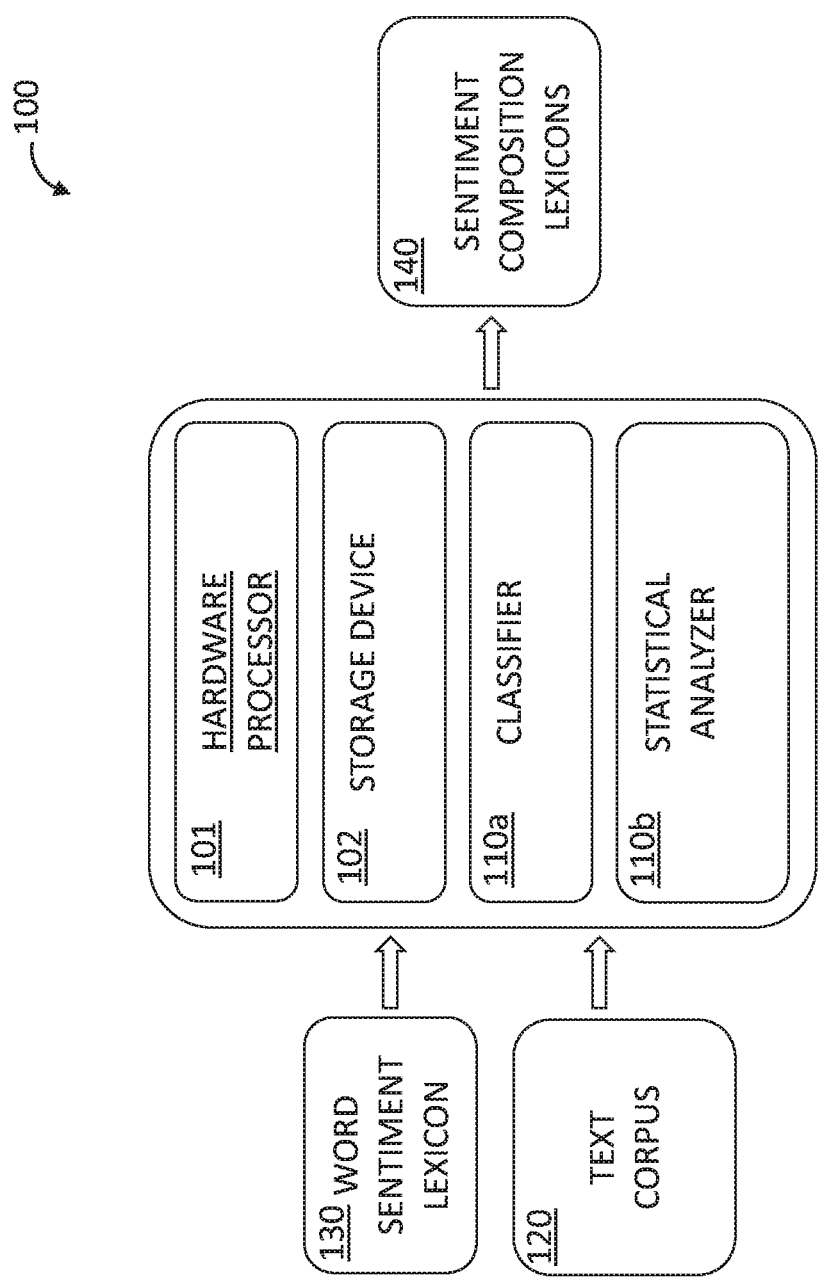
FIG. 1 is a block diagram of an exemplary system for automated acquisition of sentiment composition, according to an embodiment.

Disclosed herein are a system, method, and computer program product for performing automated sentiment composition analysis on an input text, based on a machine learning classifier trained on a word-level sentiment lexicon.

Sentiment composition is a fundamental problem in sentiment analysis. It involves a variety of semantic phenomena, such as valence shifters that reverse sentiment polarity (e.g., not happy, hardly helpful, decreased unemployment), or change its intensity (deeply/somewhat disappointed). Sentiment composition may also involve phrases containing opposing polarities, such as cure cancer, sophisticated crime, and fake success.

Another type of sentiment composition includes gradable adjectives (e.g., high income, long queue, and fast learner). For example, for a given word w, the polarity of high w, higher w, and increasing w is likely to be the same, and opposite to the polarity of low w, lower w, etc. This may allow for a more robust sentiment learning, as well as sentiment inference for such expressions.

Because the sentiment of these and similar expressions cannot be derived from the sentiment of their individual words, understanding their sentiment requires lexical composition knowledge on how specific words interact with and affect the sentiment of other words.

Previous approaches for sentiment composition relied on hand-written lists of negation words and composition rules. Such knowledge is hard to acquire, requires a high degree of manual intervention, and typically is incomplete. Other approaches aim to learn sentiment composition from sentiment-labeled texts. However, sentiment-labeled texts might not be available for certain domains or languages.

Accordingly, in some embodiments, the present invention provides for automated sentiment composition acquisition, based on a machine learning classifier trained on a word-level sentiment lexicon.

In some embodiments, in a training stage, an n-gram machine learning classifier may be trained on a training set comprising unigrams labeled with a sentiment polarity (e.g., positive, negative, or neutral). In some embodiments, in an inference stage, the trained classifier may then be applied to a lexicon of unigrams and bigrams with word embeddings, to generate a sentiment lexicon comprising a predicted sentiment for each unigram and bigram.

In some embodiments, the sentiment lexicon of unigrams and bigrams may then be used to learn sentiment compositions, based, at least in part, on statistical analyses of composition patterns within the generated lexicon. In some embodiments, the present invention defines a set of sentiment composition classes that cover a variety of sentiment composition processes, wherein sentiment compositions may be automatically extracted for each of these classes from a large text corpus.

For example, by analyzing the polarity of all bigrams consisting of the pattern <reduce+negative word> a probability can be determined with respect to the polarity of similar compositions as a whole. From that analysis, a class rule may be learned, wherein words such as reduce and preventing (and their variants) are classified as 'reversers', which, when paired with a word having a specific polarity, result in a composition having an opposite polarity as a whole (e.g., reducing violence, too powerful).

Similarly, the statistical analysis may determine that certain words act as a 'propagator' class, which, when paired with a word with an opposite sentiment, 'propagate' the sentiment of the other word to the entire composition. For example, words such as strong and incredibly, which are typically positive on their own, may be overridden when composed with a negative word (e.g., strong disapproval or incredibly disappointing). Conversely, words such as strict and critical, which are typically negative on their own, may be overridden when composed with a positive word (e.g., critical approval or strict compliance).

Another sentiment composition class may be a 'dominator' class, which dictates the sentiment of the entire bigram, while overriding any conflicting sentiment of the other unigram, if any (e.g., improving nutrition).

Another example is specific gradable pairs of related adjectives $a_1/a_2$ (e.g., high/low, fast/slow) which can alternately form positive or negative compositions, depending on the word they are being paired with (e.g., high morale vs. low morale, but high cost vs. low cost).

A potential advantage of the present invention is, therefore, in that it provides for automated acquisition of one or more sentiment composition lexicons based solely on a word-level sentiment lexicon as input, without the need for any manually-derived composition rules and lexicons, manual feature engineering, and/or sentiment-labeled texts. The present invention is easy to implement, and is readily portable to new domains and languages.

FIG. 1 is a block diagram of an exemplary system 100 for automated acquisition of sentiment composition, according to an embodiment. System 100 may comprise one or more hardware processors 101, and a non-transitory computer-readable storage medium 102. System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. In various embodiments, system 100 may comprise one or more dedicated hardware devices, one or more software modules, and/or may form an addition to or extension to an existing device.

Storage medium 102 may have encoded thereon software instructions or components configured to operate a processing unit (also "hardware processor," "CPU," or simply "processor"), such as hardware processor(s) 101. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., a classifier 110a, and a statistical analyzer 110b. In some embodiments, classifier 110a may employ different machine learning techniques and methods, which may include support vector machine (SVM) models, Naive Bayes, logistic regression, decision tree, random forest, k-nearest neighbor (KNN), and deep neural networks (DNNs).

Figure 2:
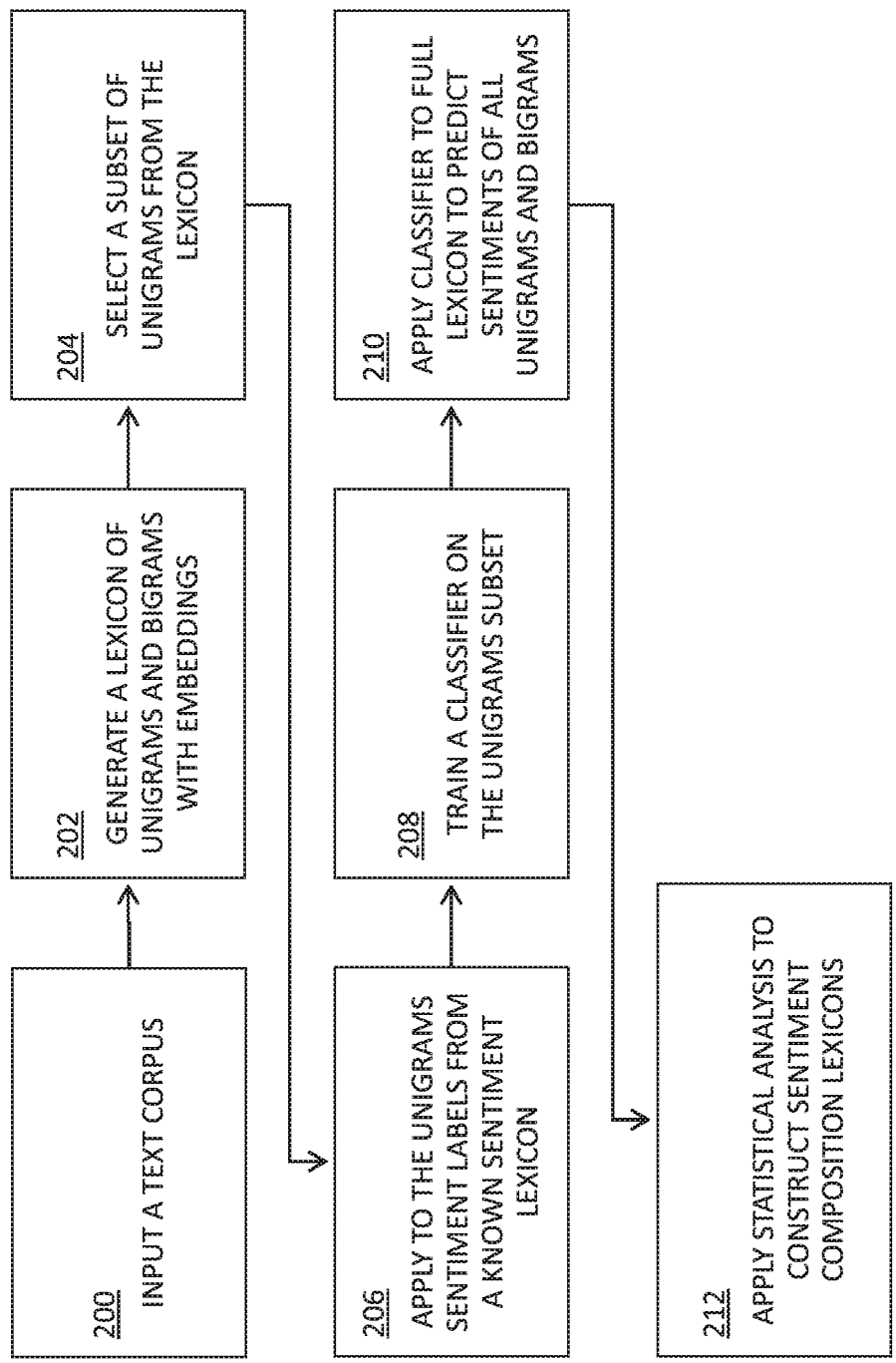
FIG. 2 is a flowchart illustrating the functional steps of a process for automated acquisition of sentiment composition lexicons, according to an embodiment.

An overview of the functional steps in a process for automated acquisition of sentiment composition by a system, such as system 100, will now be provided with continuing reference to FIG. 1 and the flowchart in FIG. 2.

In some embodiments, at steps 200 and 202, a text corpus 120 may be received as input and used to generate a lexicon of unigrams and bigrams with their word embeddings. As noted above, in some embodiments, the lexicon of unigrams and bigrams may then be used to learn sentiment compositions, based, at least in part, on statistical analyses of composition patterns within the lexicon. Because the present invention, in some embodiments, focuses on learning sentiment composition mainly from bigrams, the lexicon may advantageously contain a large number of bigrams. However, due to bigram sparsity in existing lexicons, learning bigram embeddings may require a very large text corpus. Accordingly, in some embodiments, the present invention may use text corpus 120 (FIG. 1) which may have a size in the order of $10^{11}$ tokens, acquired from a plurality of sources, such as news articles and other types of publications. In some embodiments, a known word embedding model, such as word2vec may be used (see Tomas Mikolov et al. 2013. Distributed representations of words and phrases and their compositionality. In Proceedings of the 26th International Conference on Neural Information Processing Systems, NIPS'13, pages 3111-3119, USA. Curran Associates Inc.). However, applying word2vec to a corpus of this size may still be computationally expensive.

Accordingly, in some embodiments, the present invention may employ a method for computing word sentiment-oriented embeddings, based on their pointwise mutual information (PMI) with seed sentiment words. In some embodiments, the seed sentiment words may be acquired from a publicly-available sentiment lexicon 130 in FIG. 1, such as the one proposed by Hu and Liu (2004; "HL lexicon"). (See Minqing Hu and Bing Liu. 2004. Mining and summarizing customer reviews. In Proceedings of the Tenth ACM SIGKDD International Conference on Knowledge Discovery and Data Mining, KDD '04, pages 168-177, New York, N.Y., USA. ACM).

In some embodiments, this method represents each n-gram in the lexicon (e.g., unigram or bigram) as a 6,565 dimensional vector of its Positive PMI (PPMI) with all the words in HL lexicon 130 (For a description of PPMI, see Levy et al. Improving distributional similarity with lessons learned from word embeddings. Transactions of the Association for Computational Linguistics, 3:211-225.2015).

In some embodiments, PPMI may be defined for phrases u, v as:

$$PPMI(u, v) = \max\left(0, \log\frac{f(u, v) \cdot N}{f(u) \cdot f(v)}\right),$$

where f(u) and f(v) are the number of sentences that contain u and v in the corpus, respectively; f(u, v) is the number of sentences in which u and v co-occur; and N is the number of sentences in the corpus. For example, u and v are said to co-occur if they are found in the same sentence, within a maximum distance of 10 tokens from each other, and have no overlap. Accordingly, PPMI (u, u)=0 may be defined for any u.

In some embodiments, these sparse word vectors may then be converted into dense embeddings as follows: in some cases, an embedding classification model may be created, e.g., through classifier 110a, which may then be trained on the PPMI vectors of the words in HL lexicon 130. The embedding classification model may then be applied to a large lexicon of unigrams, wherein, e.g., the 2,500 most positive words and 2,500 most negative words as predicted by the embedding classification model may be selected. Based on the PPMI vectors of these 5,000 selected words, there may be determined a projection from the 6,565 dimensional space into a reduced space of 100 dimensions. Therefore, Let M be a 5,000×6,565 matrix whose rows are the representations of the selected words. A truncated Singular Value Decomposition (see Scott Deerwester et al. 1990. Indexing by latent semantic analysis. Journal of the American Society of Information Science, 41(6):391-407. Deerwester et al., 1990) may then be calculated for M, $$M_d = U_d \cdot \Sigma_d \cdot V_d^T,$$

with d=100, following the notation of Levy et al. (2015). A PPMI row vector x for any new n-gram u (which is not present in HL lexicon 130) can then be projected into the reduced space by taking the product $x \cdot V_d$. The resulting dense representation is much more compact, and is expected to work better for lower-frequency bigrams with sparse PPMI vectors.

In some embodiments, the resulting 100-dimensional embeddings of the words in HL lexicon 130 may be used to retrain the embedding classification model. In order to assess the accuracy of the embedding classification model, the present inventors have performed a 100-fold cross validation experiment over the words in HL lexicon 130. For each fold, words that have the same stem or lemma as any word in the test set were removed from the training set. In an inference stage, the embedding classification model achieved an accuracy of 94.5%, confirming the effectiveness of the proposed method.

In some embodiments, the method described above may be used to generate a large lexicon of unigrams and unigrams with word embeddings from text corpus 120. The unigrams comprising the lexicon may (i) have a length of between 2 and 20 characters, (ii) contain only alphabetic characters, (iii) be included in WordNet (see George A. Miller. 1995. Wordnet: A lexical database for English. Commun. ACM, 38(11):39-41, November), and (iii) have a frequency in text corpus 120 of at least 2000. The resulting exemplary large lexicon may comprise, e.g., approximately 66,000 unigrams. In some embodiments, the bigrams comprising the large lexicon may include bigrams which contain only unigrams from the unigrams in the lexicon, and have a minimum frequency of 250 within text corpus 120. A resulting set of approximately 2.8 million bigrams may then undergo further processing, whereby bigrams having a PMI between their unigrams of less than 3.0 may be filtered out. In addition, bigrams whose part-of-speech tag sequence does not comport with a grammatical sequence (for example, adjective-noun, noun-noun, verb-noun, adverb-adjective, etc.) may also be filtered out. A resulting exemplary large lexicon may contain, e.g., approximately 250,000 bigrams.

In some embodiments, at a step 204, a subset of the lexicon, which may comprise unigrams as well as bigrams, may be selected from the full lexicon. At a step 206, sentiment labels may be applied to each unigram and bigram in the subset, wherein the sentiment labels may be acquired, e.g., from HL lexicon 130 or another known sentiment lexicon.

At a step 208, an n-gram classifier created, e.g., through classifier 110a in FIG. 1, may be trained on a training set comprising the subset of unigrams and bigrams with the associated embeddings and sentiment labels.

At a step 210, the n-gram classifier trained at 208 may then be applied to the full large lexicon generated at 202, to predict a sentiment of each unigram and bigram in the full lexicon. In some embodiments, the n-gram classifier's real-value predictions may be normalized to the range of [−1,1]. In some embodiments, any gram which is present in the HL-based lexicon 130 may keep its original sentiment.

In some embodiments, at 212, statistical analyzer 110b may then be configured for determining sentiment compositions with respect to the large lexicon, based, at least in part, on the predicted sentiment of each unigram and bigram derived at 210.

In some embodiments, statistical analyzer 110b may be configured for extracting one or more sentiment composition lexicons for the following classes of sentiment composition processes:

Composition classes, which model sentiment reversers, sentiment propagation and/or sentiment dominators.
Adjective classes, which determine the sentiment of phrases that contain specific gradable adjectives or their expansions.

The individual classes are listed in Table 1 below. Each class definition has two parts: (i) a 'condition' for matching the class to a bigram, and (ii) the predicted overall bigram polarity (positive +, or negative −), in case the class is matched. The condition specifies in which unigram within a bigram a composition word w from the class should be matched (i.e., unigram 1, UG1, or unigram 2, UG2), and optionally additional constraints on the other unigram. The table also shows a sample match for each class.

TABLE 1

Definition of composition and adjective classes

| # | Class | Condition UG1 | UG2 | Predicted Bigram Polarity | Example |
|---|---|---|---|---|---|
| Composition Classes | | | | | |
| 1 | Reverser + | w | − | + | combat loneliness |
| 2 | Reverser − | w | + | − | lacked courage |
| 3 | Propagator + | w | + | + | overwhelming success |
| 4 | Propagator − | w | − | − | fresh trouble |
| 5 | Dominator + | w | | + | improving nutrition |
| 6 | Dominator − | w | | − | reckless decision |
| Adjective Class | | | | | |
| 7 | ADJ($a_1$, $a_2$) +− | E($a_1$) | w | + | high morale |
| 8 | ADJ($a_1$, $a_2$) +− | E($a_2$) | w | − | low morale |
| 9 | ADJ($a_1$, $a_2$) −+ | E($a_1$) | w | − | higher inflation |
| 10 | ADJ($a_1$, $a_2$) −+ | E($a_2$) | w | + | lower inflation |

As can be seen in table 1, composition class 'reverser+' (row 1) comprises words that are matched in UG1, wherein if UG2 has a negative polarity, the resulting bigram would be positive overall, e.g., combat loneliness. Similarly, 'reverser−' (row 2) flips the polarity of the word from positive to negative, e.g., lacked courage.

Propagator classes (rows 3-4) are sentiment words that, when place in UG1 and followed by a UG2 with an opposite sentiment, 'propagate' the sentiment of UG2 to the bigram level, e.g., pure vandalism or fresh trouble. Dominators UG1 words (rows 5-6) dictate the sentiment of the entire bigram, while overriding any conflicting sentiment of UG2, if any, e.g., improving nutrition or reckless decision.

In some embodiments statistical analyzer 110b may be configured for extracting composition classes as follows: let C(c, w) be the set of bigrams in the bigram lexicon that satisfy the condition of class c for word w, and let S(c) be the set of bigrams whose polarity is the one predicted by c. The precision of w with respect to c can be defined as:

$$P(c, w) = \frac{|S(c) \cap C(c, w)|}{|C(c, w)|}$$

The above formula gives uniform weights for all the bigrams in C(c, w). However, in some cases, it may be beneficial to also take into account the uncertainty stemming from the automatic sentiment prediction of the unigrams and bigrams. This may be done by weighting each bigram according to the strength of the predicted bigram sentiment, and, in classes where the sentiment of UG2 is part of the match (i.e., reverser and propagator classes), also according to the sentiment strength of UG2. Accordingly, let s(x) be the sentiment score of an n-gram x in the lexicon, and let wu be a bigram where UG1=w and UG2=u. The weighted formula is then:

$$P(c, w) = \frac{\sum_{wu \in S(c) \cap C(c,w)} |s(u) \times s(wu)|}{\sum_{wu \in C(c,w)} |s(u) \times s(wu)|}$$

For dominator classes, s(u)=1 is taken, because the sentiment of u is not part of the match. Weak sentiment of bigrams and unigrams (between −0.1 and 0.1 for unigrams, and between −0.05 and 0.08 for bigrams) may be is considered a neutral sentiment.

In some embodiments, c includes words w such that P(c, w)>α, and |C(c, w)|≥k. In some embodiments, |C(c, w)| may be used as a confidence measure, by which the words in each class may be ranked. In some embodiments, α=0.8; k=10 may be for reversers and propagators, and α=0.95; k=20 for dominators.

In some embodiments, statistical analyzer 110b may be further configured for defining adjective classes for specific pairs of opposing gradable adjectives $(a_1, a_2)$ (rows 7-10 in table 1). Because $(a_1, a_2)$ are antonyms, it may be assumed that if a bigram $a_1 w$ is positive, then the bigram $a_2 w$ is likely to be negative, and vice versa. Accordingly, two composition classes may be determined for each pair: $ADJ(a_1, a_2)+-$ contains words that are positive with $a_1$ and negative with $a_2$, while $ADJ(a_1, a_2)-+$ contains words that are negative with $a_1$ and positive with $a_2$. In some embodiments, adjective classes may be determined as follows. A set of expansions E(a) may be manually defined for each adjective a (wherein E(a) also includes a itself). For example, 'higher,' and 'increasing,' may be defined for 'high.' Let B(a, w) be the set of all the bigrams in the generated lexicon such that UG1 is in E(a) and UG2 is w. The score of a given word w with respect to the adjective pair $(a_1, a_2)$ is defined as:

$$S_{((a_1,a_2))}(w) = \frac{\sum_{x \in B(a_1, w)} s(x)}{|B(a_1, w)|} - \frac{\sum_{x \in B(a_2, w)} s(x)}{|B(a_2, w)|}$$

Then, words w with $S(a_1, a_2)(w)$ above 0.1 or below −0.1 are selected for $ADJ(a_1, a_2)+-$ and $ADJ(a_1, a_2)-+$, respectively, where the absolute value of this score is used to rank the predictions.

Experimental Results

The following section briefly describes lexicons that were acquired by the present invention for each composition class, using the functional steps described above with reference to FIGS. 1 and 2. Table 2 gives the number of words in the lexicon in each class:

TABLE 2

Number of words per class

| Class | Word Count |
|---|---|
| Reverser + | 54 |
| Reverser − | 106 |
| Propagator + | 48 |
| Propagator − | 152 |
| Dominator + | 666 |
| Dominator − | 662 |
| ADJ(high, low) +− | 316 |
| ADJ(high, low) +− | 416 |
| ADJ(fast, slow) −+ | 294 |
| ADJ(fast, slow) −+ | 70 |
| Total | 2783 |

In total, 2,783 words were learned, wherein the classes with the largest number or acquired words are the dominators, despite the fact that higher thresholds are applied to their results, compared to the reversers and the propagators. A possible explanation is that because the matching condition for propagators is the weakest.

Table 3 below shows the top-ranked words in each composition class. Each class word is followed by a sample UG2 match for that word and the class in the bigram lexicon. Interestingly, the classes learned for reverser + and reverser − have very little overlap, indicating that the reversers operating on positive words are rather different from those operating on negative words.

TABLE 3

Top-ranked words in each composition class

| REV⊕ | | PROP⊕ | | DOM⊕ | |
|---|---|---|---|---|---|
| less | wasteful | critical | acclaim | unique | culture |
| reduce | stress | cloud | solution | beautiful | gardens |
| reducing | inflammation | proprietary | insights | wonderful | atmosphere |
| preventing | violence | complex | ideas | innovative | approach |
| fewer | dropouts | challenging | endeavor | digital | capabilities |
| combat | inequality | overwhelming | victory | excellent | service |
| reduces | fraud | invasive | therapy | strategic | thinker |
| healthy | ageing | intense | commitment | creative | spirit |
| eliminate | racism | strict | compliance | diverse | environment |
| reduced | bureaucracy | disruptive | innovation | good | deeds |

| REV⊖ | | PROP⊖ | | DOM⊖ | |
|---|---|---|---|---|---|
| poor | reputation | pretty | awful | too | often |
| too | powerful | significant | concern | illegal | actions |
| not | happy | incredibly | boring | serious | consequences |
| sexual | liberation | strong | disapproval | severe | problems |
| inadequate | protection | powerful | adversary | alleged | plot |
| lacked | commitment | sharp | pain | allegedly | abusive |
| bad | luck | great | danger | poor | sanitation |
| otherwise | decent | fresh | injury | heavy | debt |
| negative | contribution | hot | mess | dangerous | situation |
| insufficient | protection | clearly | drunk | violent | outbursts |

Table 4 below shows the top-ranked words for adjective classes. For example, high morale is positive, and low morale is negative, while for unemployment it is the other way around.

TABLE 4

| Top-ranked words in adjective classes | | | |
|---|---|---|---|
| Adj(high, low)⊕⊖ | Adj(high, low)⊕⊖ | Adj(fast, low)⊕⊖ | Adj(fast, slow)⊕⊖ |
| morale | unemployment | economic | turns |
| productivity | poverty | broadband | temper |
| ceilings | crime | implementation | spiral |
| literacy | costs | loading | escalation |
| standards | anxiety | response | buck |
| quality | noise | progress | spreading |
| ethical | violence | wit | spread |
| profitability | debt | learner | breathing |
| visibility | inequality | reaction | escalates |
| competitiveness | handedness | growth | population |

In addition, a manual assessment was conducted to determine the precision of each class, by measuring the fraction of bigrams that have the polarity predicted by the class, out of the bigrams matched by the class. To this end, a random sample of bigrams matched by each class was selected from the bigram lexicon. A noted above, some of the classes require a positive or negative sentiment in UG1 and/or UG2. The objective, is, therefore, to estimate the precision of the predicted bigram polarity, given that the matching is correct. In order to avoid incorrect sentiment matches caused by errors in the automatically-learned unigram sentiment lexicon, the sentiment matches were restricted to words from the HL lexicon 130. 100 bigrams were sampled for each composition class, except for propagator +, which only had 59 matching bigrams. In addition, 100 bigrams were sampled for each adjective pair (conflating the positive and negative classes for each pair).

Each of the resulting 759 bigrams was manually annotated by three human annotators, who were asked to assess the bigram sentiment (positive/negative/neutral). The assessors also had the option to indicate that the bigram is an incomplete phrase. Fleiss' kappa (see Joseph L. Fleiss. 1971. Measuring nominal scale agreement among many raters. Psychological Bulletin, 76(5):378-382 Fleiss, 1971) for inter-annotator agreement was 0.61, indicating substantial agreement (see also J. Richard Landis and Gary G. Koch. 1977. The measurement of observer agreement for categorical data. Biometrics, 33(1):159-174). The gold label for each bigram was obtained by taking the majority annotation. Ties (34 in total) were adjudicated by one of the authors. Some 59 bigrams assessed as incomplete were then removed, and precision was computed for each class over the remaining 700 bigrams.

The results are summarized in Table 5. The precision achieved by the various classes seems very promising, in particular considering that the only sentiment-annotated input for learning these classes was a unigram sentiment lexicon. Error analysis reveals that the vast majority of misclassifications (84.6%) were labeled as neutral by the majority of the annotators, and in 25.1% of them, one annotator agreed with the class prediction, and the other two were neutral.

TABLE 5

| Precision assessment | | | |
|---|---|---|---|
| | Precision | | |
| Class | + | − | Total |
| Reverser | 0.79 | 0.78 | 0.78 |
| Propagator | 0.75 | 0.81 | 0.79 |
| Dominator | 0.71 | 0.79 | 0.75 |
| Adj(high, low) | | | 0.68 |
| Adj(fast, slow) | | | 0.75 |
| All | | | 0.76 |

The learned classes provide a good starting point for semi-automatic construction of composition lexicons. Further processing of the results (e.g., manual filtering) can significantly improve precision.

Further Experimentation

This section demonstrates the contribution of the learned composition and adjective classes to both phrase-level and sentence-level sentiment classification tasks. In line with the present method for learning the classes, this section focuses on sentiment analysis methods that do not rely on sentiment-labeled phrases or sentences for training.

Phrase Polarity Classification

In this experiment, the extracted composition lexicons were tested against the Opposing Polarity Phrases (OPP) lexicon released by Kiritchenko and Mohammad (2016), which consists of phrases with words of opposing polarity. (Svetlana Kiritchenko et al. 2016. Sentiment composition of words with opposing polarities. In Proceedings of the 2016 Conference of the North American Chapter of the Association for Computational Linguistics: Human Language Technologies, pages 1102-1108, San Diego, Calif., June. Association for Computational Linguistics 2016).

The OPP dataset contains the sentiment score of each n-gram, the part-of-speech tags of the constituent unigrams, and the sentiment of all the unigrams included in the phrases, with a total of 307 bigram and 262 trigram phrases with a nonzero sentiment score. The phrases were collected from Twitter (www.twitter.com), and the sentiment scores were obtained by manual annotations. The purpose of the OPP lexicon is to train and test sentiment composition models for opposing polarity phrases and therefore it is suitable for testing our classes and bigram sentiment prediction methods.

Table 6 shows the experimental results on the OPP dataset.

TABLE 6

| OPP dataset experimental results | | | | |
|---|---|---|---|---|
| Exp. | Sentiment Score | Accuracy (All) | Coverage | Accuracy (Covered) |
| c0 | Most polar unigram | 0.668 | | |
| c1 | Composition | 0.713 | 0.355 | 0.761 |
| c2 | Bigram score | 0.726 | 0.309 | 0.863 |
| c3 | Bigram score or Composition | 0.746 | 0.541 | 0.807 |

The baseline, c0, is the best-performing unsupervised method reported by Kiritchenko and Mohammad. This method determines the bigram polarity according to the most polar unigram score. Then, in experiment c1 (composition), the present invention predicts the sentiment of the bigram by trying to match each of the composition classes in the bigram according to the following order: adjective, reverser, propagator, and dominator. The order is based on the match specificity of the other word in the bigram (the non-class word): adjective requires a match in a small set of adjective expansions, reverser and propagator only require a certain polarity (positive/negative), and dominator does not restrict the other word. The first class that is applicable for the bigram is selected. For the matched class, the bigram sentiment is predicted according to the rules in Table 1 above. In experiment c2, the predicted bigram score was used, and in c3 the two methods were used in cascade: if the bigram score is not available, the composition method of c1 is tried. In all three experiments, the most polar unigram score (c0) is used in cases that the test bigram is not covered by the predictions, so the accuracy results under the Accuracy (All) column are reported over the complete dataset. The coverage of each method is defined as the fraction of predicted bigrams out of all the bigrams in the dataset. Finally, Accuracy (Covered) is the accuracy only for the bigrams covered by each of the methods c1-c3. The best performance is achieved by configuration c3, which utilizes both the bigram sentiment scores and the composition and adjective classes. By combining the two methods, both idiomatic phrases (e.g., top gun) and compositional phrases (e.g., great loss) can be addressed in the OPP dataset. Experiment c3 achieves an absolute improvement of 7.8% in accuracy with respect to the baseline c0, over the whole dataset. The differences between c1-c3 and the baseline c0 are all statistically significant, with p<0.05 for c1, and p<0.01 for c2 and c3, according to McNemar's test (see Brian S. Everitt. 1992. The analysis of contingency tables. Chapman & Hall/CRC. Everitt, 1992). The results show that the present sentiment and composition lexicons are effective even in a domain such as Twitter, which is rather different from the corpus which was used for learning.

Sentence Polarity

The contribution of the composition and adjective classes to a lexicon-based sentiment classification of sentences was further assessed with respect to sentence polarity predictions.

The baseline system matches terms from the HL lexicon 130 (FIG. 1) in the sentence. If the number of positive matches is greater than negative matches, positive is predicted; if there are more negative matches, negative is predicted; in all other cases, neutral is predicted.

Classes are then added incrementally. If a class is matched in a bigram, it may modify the sentiment of that bigram. For example, suppose that the sentence contains the bigram preventing cancer. The baseline system will match cancer from the HL lexicon 130 in the bigram, giving it negative sentiment of −1. Then the word preventing from the class reverser+ will be matched (row 1 in Table 1 above), since it is followed by a negative unigram. As a result, the sentiment of the bigram will become positive, and will get the score 1.

The classes were added in the same order as in the previous experiment: adjectives, reversers, propagators, and dominators. No multiple classes are allowed to match the same bigram.

For testing these lexicons, the Claim Stance Dataset introduced by Bar-Haim et al. (2017a) is used (see Roy Bar-Haim et al. 2017a. Stance classification of context-dependent claims. In Proceedings of the 15th Conference of the European Chapter of the Association for Computational Linguistics: Volume 1, Long Papers, pages 251-261, Valencia, Spain, April. Association for Computational Linguistics.) This dataset contains Pro and Con claims found in Wikipedia for 55 controversial topics, and also includes labels for sentiment. This dataset was chosen due to its diversity, and the fact that it was also approached with a lexicon-based sentiment analysis by Bar-Haim et al. This dataset has 2,252 claim sentences that contain sentiment annotations (1012 positive and 1240 negative).

Table 7 shows results for the sentiment prediction with the baseline and after the addition of each class.

TABLE 7

Results from sentence polarity assessment

| | Positive | | | Negative | | | | |
|---|---|---|---|---|---|---|---|---|
| | Precision | Recall | F1 | Precision | Recall | F1 | Accuracy | Coverage |
| Baseline | 0.703 | 0.462 | 0.588 | 0.810 | 0.525 | 0.637 | 0.761 | 0.653 |
| +Adjective | 0.703 | 0.480 | 0.571 | 0.815 | 0.530 | 0.642 | 0.764 | 0.665 |
| +Reverser | 0.724 | 0.487 | 0.582 | 0.822 | 0.541 | 0.653 | 0.778 | 0.665 |
| +Propagator | 0.724 | 0.488 | 0.583 | 0.823 | 0.545 | 0.656 | 0.788 | 0.667 |
| +Dominator | 0.720 | 0.547 | 0.622 | 0.820 | 0.546 | 0.655 | 0.772 | 0.708 |

Precision, recall, and F1 are used to measure performance for positive and negative classes and accuracy and coverage to measure overall performance, following previous work on this dataset. Bar-Haim et al. define 'accuracy' as $$\frac{\#correct}{\#predicted}$$

and 'coverage' as $$\frac{\#predicted}{\#sentences}.$$

If the system returns a neutral label, is not counted as a prediction. There is consistent improvement over the baseline and each of the classes contributes to some improvement. F1 for the positive class continues to improve with each additional lexicon. The case is similar for negative F1 and accuracy, which improve up to dominator class.

Table 8 shows how the classes are being matched and the impact this has on sentiment prediction.

TABLE 8

Impact of class matches

| | Sentence | | | | Bigram | | |
|---|---|---|---|---|---|---|---|
| | Match | ↑ | ↓ | ↔ | Match | = | ≠ |
| +Adjective | 59 | 27 | 9 | 23 | 63 | 52 | 11 |
| +Reverser | 40 | 31 | 4 | 5 | 40 | 35 | 5 |

TABLE 8-continued

Impact of class matches

| | Sentence | | | | Bigram | | |
|---|---|---|---|---|---|---|---|
| | Match | ↑ | ↓ | ↔ | Match | = | ≠ |
| +Propagator | 10 | 6 | 0 | 4 | 10 | 8 | 2 |
| +Dominator | 903 | 164 | 132 | 307 | 1160 | 808 | 352 |

The left-hand side of the table reports the number of sentences with class matches and breaks down how often they help ↑, hurt ↓, or stay the same ↔, compared to the previous lexicon (e.g., adjective vs the baseline). As can be seen, for the first three classes, fewer bigrams are matched, but consistently help sentiment prediction. Adding the dominator lexicon helps more than it hurts but the numbers are more balanced. More cases can be seen where the prediction remains the same. This is because much of the dominant sentiment learned is consistent with the original lexicon. For example, matching the dominator good in the bigram good decision, while a correct match, will have no effect on the bigram polarity, since good was already matched from the HL lexicon 130 as a unigram.

Without manual labels for all bigrams, another option for roughly checking the quality of the bigram matches is to check if the sentiment of the bigram is consistent with that of the sentence. This is shown in the right-hand side of Table 8 with a report of the bigram matches. Multiple bigrams can match in a sentence so there may be more bigram matches than sentence matches. If the bigram is given the same sentiment as the sentence, it is counted it as consistent =, otherwise inconsistent ≠. This does not strictly mean that the bigram polarity is correct or not, but it does give a rough idea if the sentiment is correct and if it helps improve the sentence sentiment prediction. The results show that all the classes are consistent with the sentence sentiment in most of the cases. The dominators have far more matches but they are also much noisier than the other classes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    operating at least one hardware processor for:
        generating, from a text corpus, a lexicon of unigrams and bigrams comprising an embedding for each of said unigrams and bigrams;
        training a machine learning classifier on a training set comprising a subset of said lexicon, wherein each of said unigrams and bigrams in said subset has a sentiment label;
        applying said machine learning classifier to said lexicon, to (i) predict a sentiment of each of said unigrams and bigrams, and (ii) update said lexicon with the predicted sentiments;
        performing statistical analysis on said updated lexicon, to extract one or more sentiment composition lexicons, wherein:
            each of said one or more sentiment composition lexicons is associated with a sentiment composition class,
            with respect to each said sentiment composition class, said statistical analysis comprises determining a statistical ratio between (i) all bigrams in said updated lexicon meeting said conditions of said sentiment composition class, and (ii) all bigrams in said updated lexicon meeting said conditions of said sentiment composition class, whose sentiment is equal to said predicted sentiment associated with said sentiment composition class; and
        predicting a sentiment of a bigram comprising a first unigram from a said sentiment composition lexicon based, at least in part, on meeting one or more conditions of said associated sentiment composition class, wherein said conditions comprise at least one of (i) an ordering of said first unigram and a second unigram within said bigram, (ii) a sentiment of said first unigram, and (iii) a sentiment of said second unigram.

2. The method of claim 1, wherein said statistical analysis further takes into account, with respect to each bigram, a probability of said prediction performed by said machine learning classifier.

3. The method of claim 1, wherein said sentiment composition class is selected from the group consisting of: a reverser class, a propagator class, and a dominator class.

4. The method of claim 3, wherein:
    (i) when said first unigram is associated with said reverser class, said predicted bigram sentiment is the opposite of said second unigram sentiment;
    (ii) when said first unigram is associated with said propagator class, said predicted bigram sentiment is equal to said second unigram sentiment; and
    (iii) when said first unigram is associated with said dominator class, said predicted bigram sentiment is equal to said first unigram sentiment.

5. The method of claim 1, wherein said sentiment composition class is an adjective class, and wherein a bigram comprising a unigram from a said sentiment composition lexicon associated with said adjective class has (i) a first predicted sentiment when paired with a first adjective from a specified pair of antonymic adjectives, and (ii) an opposite predicted sentiment when paired with a second adjective from said specified pair of antonymic adjectives.

6. The method of claim 5, wherein, with respect to each unigram in said adjective composition class, said statistical analysis comprises determining whether a combined score equal to an absolute value of (i) an average sentiment score for all bigrams comprising said unigram and said first adjective, less (ii) an average sentiment score for all bigrams comprising said unigram and said second adjective, meets a specified threshold.

7. The method of claim 6, wherein each adjective in said specified pair of antonymic adjectives comprises a plurality of synonyms of said adjective.

8. A system comprising:
    at least one hardware processor; and
    a non-transitory computer-readable storage medium having stored thereon program instructions, the program instructions executable by the at least one hardware processor to:
        generate, from a text corpus, a lexicon of unigrams and bigrams comprising an embedding for each of said unigrams and bigrams;
        train a machine learning classifier on a training set comprising a subset of said lexicon, wherein each of said unigrams and bigrams in said subset has a sentiment label;

apply said machine learning classifier to said lexicon, to (i) predict a sentiment of each of said unigrams and bigrams, and (ii) update said lexicon with the predicted sentiments;

perform statistical analysis on said updated lexicon, to extract one or more sentiment composition lexicons, wherein:
- each of said one or more sentiment composition lexicons is associated with a sentiment composition class,
- with respect to each said sentiment composition class, said statistical analysis comprises determining a statistical ratio between (i) all bigrams in said updated lexicon meeting said conditions of said sentiment composition class, and (ii) all bigrams in said updated lexicon meeting said conditions of said sentiment composition class, whose sentiment is equal to said predicted sentiment associated with said sentiment composition class; and predict a sentiment bigram comprising a first unigram from a said sentiment composition lexicon based, at least in part, on meeting one or more conditions of said associated sentiment composition class, wherein said conditions comprise at least one of (i) an ordering of said first unigram and a second unigram within said bigram, (ii) a sentiment of said first unigram, and (iii) a sentiment of said second unigram.

9. The system of claim 8, wherein said statistical analysis further takes into account, with respect to each bigram, a probability of said prediction performed by said machine learning classifier.

10. The system of claim 8, wherein said sentiment composition class is selected from the group consisting of: a reverser class, a propagator class, and a dominator class.

11. The system of claim 10, wherein:
(i) when said first unigram is associated with said reverser class, said predicted bigram sentiment is the opposite of said second unigram sentiment;
(ii) when said first unigram is associated with said propagator class, said predicted bigram sentiment is equal to said second unigram sentiment; and
(iii) when said first unigram is associated with said dominator class, said predicted bigram sentiment is equal to said first unigram sentiment.

12. The system of claim 8, wherein said sentiment composition class is an adjective class, and wherein a bigram comprising a unigram from a said sentiment composition lexicon associated with said adjective class has (i) a first predicted sentiment when paired with a first adjective from a specified pair of antonymic adjectives, and (ii) an opposite predicted sentiment when paired with a second adjective from said specified pair of antonymic adjectives.

13. The system of claim 12, wherein, with respect to each unigram in said adjective composition class, said statistical analysis comprises determining whether a combined score equal to an absolute value of (i) an average sentiment score for all bigrams comprising said unigram and said first adjective, less (ii) an average sentiment score for all bigrams comprising said unigram and said second adjective, meets a specified threshold.

14. The system of claim 13, wherein each adjective in said specified pair of antonymic adjectives comprises a plurality of synonyms of said adjective.

* * * * *